US005519636A

United States Patent [19]

Stoll et al.

[11] Patent Number: 5,519,636

[45] Date of Patent: May 21, 1996

[54] ELECTRONIC CONTROL DEVICE FOR A VALVE RANGE OF MODULAR DESIGN

[75] Inventors: Kurt Stoll, Esslingen; Thomas Lederer, Kernen; Dieter Ruckwied, Rechberghausen, all of Germany

[73] Assignee: Festo KG, Esslingen, Germany

[21] Appl. No.: 218,907

[22] Filed: Mar. 28, 1994

[30] Foreign Application Priority Data

Apr. 20, 1993 [DE] Germany .......................... 43 12 757.6

[51] Int. Cl.[6] ........................................ G06F 9/00

[52] U.S. Cl. .......................... 364/505; 364/510; 364/138; 364/550; 364/147; 340/825.23

[58] Field of Search ................................ 364/505, 510, 364/501, 142, 130, 500, 465, 138, 464.04, 492, 550, 551.01, 140, 147, 479, 145; 340/825.06, 825.07, 825.18, 825.21, 825.22, 825.52, 825.54, 825.23; 251/129.01–.09; 141/192, 83, 95, 144; 222/14, 144.5, 17, 64, 52

[56] References Cited

U.S. PATENT DOCUMENTS

| | | | |
|---|---|---|---|
| 3,875,955 | 4/1975 | Gallatin et al. | 364/510 |
| 4,007,028 | 2/1977 | Bublitz et al. | 364/142 |
| 4,187,543 | 2/1980 | Healey et al. | 364/505 |
| 4,360,877 | 11/1982 | Langston et al. | 364/465 |
| 4,396,976 | 8/1983 | Hyatt | 364/130 |
| 4,498,916 | 2/1985 | Jensen | 364/501 |
| 5,153,837 | 10/1992 | Shaffer et al. | 364/464.04 |
| 5,204,669 | 4/1993 | Dorfe et al. | 340/825.07 |
| 5,233,346 | 8/1993 | Minerd et al. | 340/825.22 |
| 5,278,749 | 1/1994 | De Man | 364/145 |
| 5,289,365 | 2/1994 | Caldwell et al. | 364/492 |
| 5,306,995 | 4/1994 | Payne et al. | 340/825.22 |
| 5,333,114 | 7/1994 | Warrior et al. | 364/550 |
| 5,450,346 | 9/1995 | Krummen et al. | 364/147 |
| 5,458,048 | 10/1995 | Hohner | 91/459 |

*Primary Examiner*—Emanuel T. Voeltz
*Assistant Examiner*—Hal D. Wachsman
*Attorney, Agent, or Firm*—Hoffmann & Baron

[57] ABSTRACT

An electronic control device for a modular valve range, which has a fluid manifold arrangement fitted with electrically controlled valves. The valves are controlled via at least one control module. Furthermore input and/or output modules and a central electronic control unit are provided, with which the individual modules are connected for control and/or data communication. The control unit is connected with the modules via a bus line system and each module possesses a programmed address decoder, means being provided for sequential configuration of the modules and for the automatic assignment of individual addresses for the individual modules. Accordingly the valve range may be designed and expanded just as may be desired, the connected modules automatically being recognized and provided with addresses.

19 Claims, 4 Drawing Sheets

ELECTRONIC CONTROL DEVICE FOR A VALVE RANGE OF MODULAR DESIGN

BACKGROUND OF THE INVENTION

The invention relates to an electronic control device for a valve range of modular design, which comprises a fluid manifold arrangement fitted with an electrically controlled valve, the valves being adapted to be controlled via at least one control modules, said control device comprising input and/or output modules and a central electronic control unit, with which the individual modules can be connected for control and/or data communication.

Control devices of this type have long been supplied by the assignee as valve ranges or sets of valves, in which case a plate-like fluid manifold or distributor in one or more parts is fitted with multiway valves. Moreover such a valve range of modular design may comprise input/output modules for the input of sensor signals or for the control of further external devices. In such a case the central control unit controls different modules via a bus line system. One such electronic control device or, respectively, valve range is for instance described in the German patent publication 9,211,109 U.

Conventionally in such equipment each module possesses an address decoder, which compares a set address of the respective module with the current address appearing on the address bus. It is only in the case of equivalence that a control microprocessor of the central control unit can access this module. The addresses are in this case normally set using switches or permanent wiring. During the manufacture of such a known valve range it is consequently necessary to set the addresses for each module the be brought into agreement with the program of the central control unit. This represents an extremely slow and involved process, more especially in the case of adding further modules to an existing valve range, as for example when further sensors are to be installed, further external devices are to be controlled or further additional valves are to be actuated.

SHORT SUMMARY OF THE INVENTION

One object of the invention is therefore to provide for a simplification of the addressing of modules of a valve range.

In order to achieve these and/or other objects appearing herein the control unit is connected with the modules via a bus line system, each module comprises a programmable address decoder and means are provided for the sequential configuration of the modules and for the automatic assignment of the individual addresses for the individual modules.

The device in accordance with the invention leads to an extremely flexible, automatic assignment of addresses without any manual adjustments being required. The automatic address assignment furthermore remains effective for a later expansion of the valve range by the addition of further modules and the electronic control unit automatically allots additional addresses.

The further developments of the invention in accordance with the claims lead to improvements in the control device in accordance with the invention.

For the storage of the assigned addresses the address decoders more particularly comprise RAMs, in which the respective current valid address may be stored from the central control unit.

In accordance with an advantageous development, in a configuration phase, active means are provided for sequential stepping of access to the individual address decoders by means of the control unit, an address or an address mask being stored in the respective address decoder during access. Accordingly the individual address decoders are provided with addresses in succession and, respectively, the existing addresses are overwritten by new addresses. The addresses to be stored are in this case supplied via an address bus to the address decoders. Programming is accordingly performed without the use of data lines, since the data are transferred via the address lines.

The configuration phase is preferably run as an initialization phase. In this respect means are provided for the interrogation and identification of the respective module during the access phase, suitable individual module identification data being supplied via a data bus to the control unit. Accordingly prior to address assignment there is a system configuration identification which is also implemented automatically. The transmitted module identification data are linked in the control unit with the address assigned to the corresponding module.

Furthermore it is an advantage to provide means for the automatic switching over to a run time phase after performance of the configuration phase. The configuration phase itself is triggered by a write access to an address reserved therefor.

In the valve range it is possible for an address decoder to be assigned to each valve, but it is possible as well for several valves to be associated with one address decoder, which is loaded with an address mask and a corresponding number of addresses.

For the control of the passage of input and/or output signal in the respective modules control outputs of the address decoders are connected with electronic switches controlling such input and/or outputs signals, which for instance may be designed in the form of buffers or flipflops.

The central control unit may in an advantageous fashion be designed in the form of a field bus station and operate in a self-contained manner in conjunction with other field bus stations.

In a convenient, readily assembled and readily expanded mechanical arrangement a variable number of modules are able to be arranged on the central control unit, preferably in a row arrangement consisting of one row. Consequently any desired number of further modules may be added to such a row, an address being automatically assigned in the next configuration or, respectively, initialization phase.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
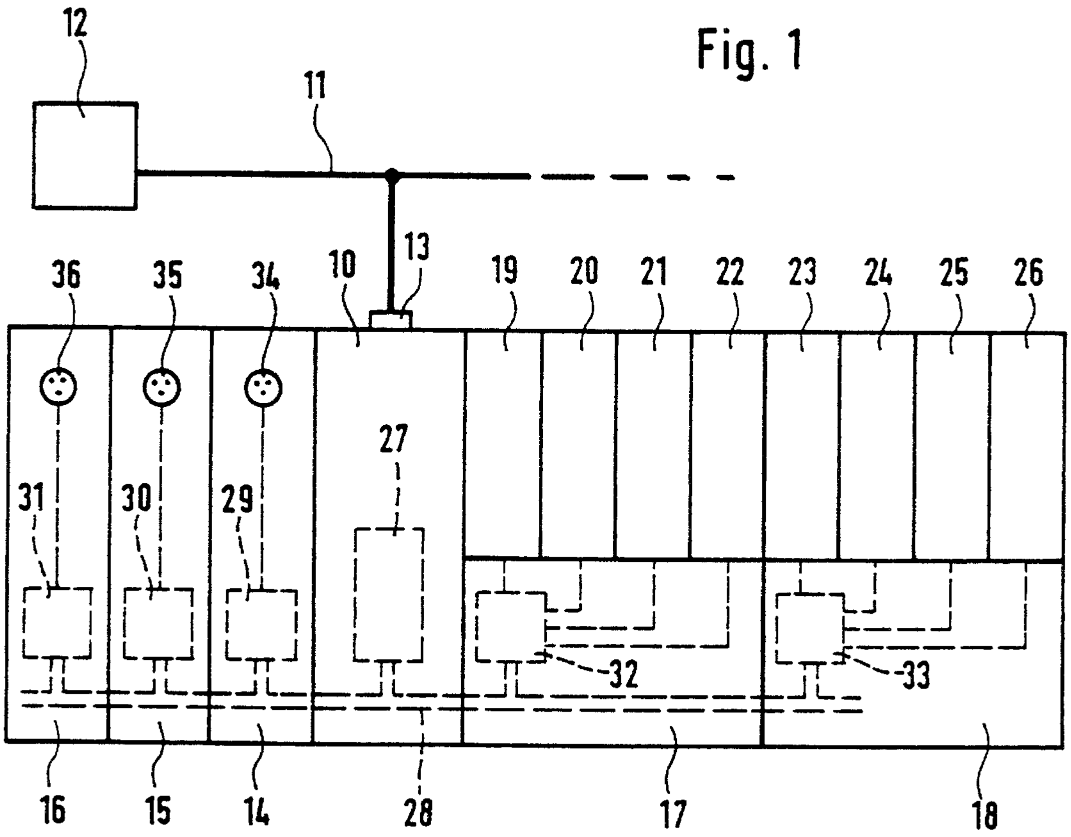
FIG. 1 is a diagrammatic overall view of a valve range with valve modules and input and output modules.

In the case of the embodiment of a valve station illustrated in FIG. 1 a central electronic control unit 10 is designed in accordance with the prior art as a field bus station and is connected with a normally two-core field bus 11. Several such control units 10 or, respectively, valve ranges can be connected with the field bus 11, something which is indicated by continuation of the field bus 11 in broken lines. In this respect it is possible for a central computer 12 connected with the field bus 11 to control the individual control units 10 as a master station, or it is possible however for such central computer 12 simply to transmit the control program to the control unit 10, which latter may then control the valve range in an independent fashion. In this case it is furthermore possible for an indicating and/or operating unit to be connected with an interface 13 of the control unit. Another possibility would be that in the case of several valve ranges, connected together via the field bus 11, a control unit 10 would operate as a master unit with the remaining control units operating as slaves under its control.

In a now arrangement on one side three input and/or output modules 14 through 16 are joined with this control unit 10, such modules for instance being screwed together in a manner not shown in detail. On the opposite side two valve modules 17 and 18 are connected with the control unit 10 in a row arrangement, and they respectively bear four valves 19 through 19 and, respectively, 22 through 26. Such a valve module normally consists, in a manner not illustrated in detail, of a manifold for a pneumatic of hydraulic fluid, which in the interior possesses supply and venting ducts. In the illustrated working embodiment of the invention the four valves 19 through 22 and, respectively, 23 through 26 are mounted, which via a branch duct system are in communication with the ducts of the fluid manifold. Connection means provided on the valves render possible the connection of pressure fluid ducts, which lead to fluid power equipment, which is not illustrated either. Each valve 19 through 26 possesses an electrically operated valve drive.

The control unit 10 possesses a microprocessor 27 as a central programmed device, which is connected via a bus line system 28 with programmed address decoders 29 through 33 in the modules 14 through 18. In the case of the input and/or output modules 14 through 16 such address decoders 29 through 31 control the passage of input and/or output signals to the input or, respectively, output connections 34 through 36. In the case of the valve modules 17 and 18 such address decoders 32 and 33 control the individual valves 19 through 26.

In the course of the assembly of the individual modules 14 through 18 the bus line connections are automatically produced by suitable plug-in means, as for instance by means of boards extending through the modules, which at their ends are designed in the form of male or female plug system elements. In the case of the valve modules 17 and 18 the fluid power connection are simultaneously produced between the individual fluid manifolds.

As a possible departure from the illustrated embodiment of the invention it is naturally possible in principle to provide a single uninterrupted fluid manifold, on which the valve modules are mounted, which only comprise the valve, the valve controls and the address decoders. A further possibility is to associate a large number of valves to a single address decoder, or however also for instance to assign a separate address decoder to each valve. In the first case it would be feasible for example to have a single address decoder for the control of all valves.

The entire valve range may naturally also be adapted to operate in a entirely independent manner, that is to say the control unit 10 would be designed as an independent control unit rather than being connected with a field bus or the like.

Figure 2:
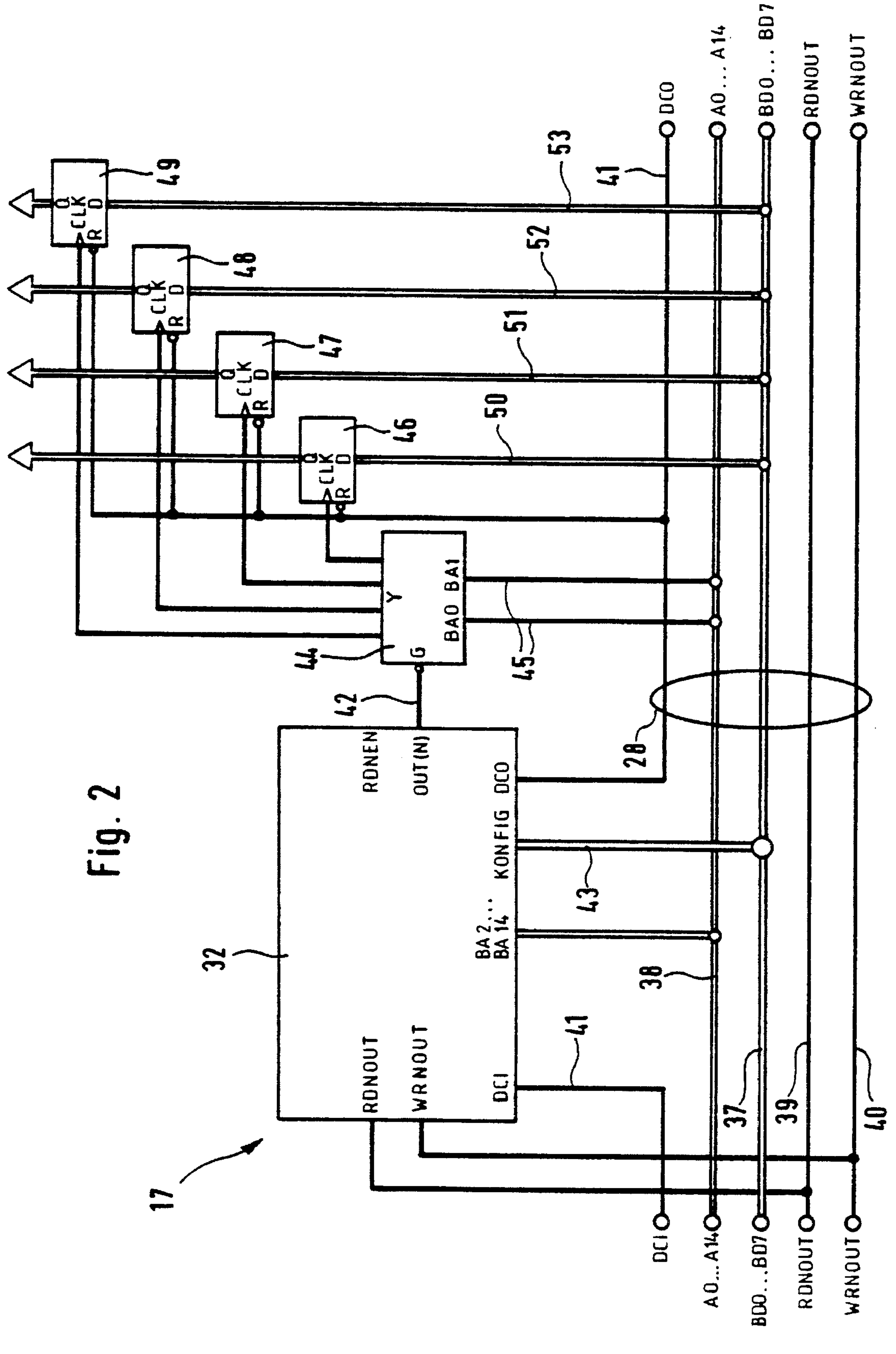
FIG. 2 is a circuit diagram of a valve module.

In FIG. 2 as an embodiment of the invention the valve module 17 is represented to indicate its electronic circuit. The bus line system 28 inside the valve range consists of a data bus 37 comprises eight data lines BD 0 through BD 7, an address bus 38 comprises fifteen address lines AO through A14, control lines 39 and 40 (RDNOUT and WRNOUT) and a so-called daisy chain connection 41 (CDI/DCO). All these lines are connected with the address decoder 32. The design of such an address decoder may be generally in accordance with prior art, non-programmed address decoders with the exception that in this case there is the additional provision of an internal RAM (not illustrated), into which the addresses may be read in via the address bus 37. Furthermore there is the provision of a comparator (not illustrated either) which compares the stored address with the respective address present on the address bus 37 during run time and in the case of agreement of the addresses supplies a control signal via an output line 42. Moreover this address decoder 32 comprises individual module identification data, which are able to be applied via corresponding line 43 to the data bus 37. In this respect it may be for instance a question of a permanently switched data word.

The output line 42 is connected with an enable output G of a decoder 44, for which for example the commercially available component HC 239 may be employed. This decoder 44 is connected via two address lines 45 with the address bus 38. Control outputs of such decoder 44 control four D-flipflops 46 through 49, which perform a switching function in the control lines 50 through 53, which connect the data bus 37 with the electrical drives of the valves 19 through 22. The number of the D-flipflops 46 through 49, of the control lines 50 through 53 and of the address lines 45 is naturally dependent on the number of valves to be served.

DESCRIPTION OF THE MANNER OF OPERATION OF THE SYSTEM

An account will now be provided of the entire self-configuring system in the following. After switching on the power supply at the operational voltage the operating system of the microprocessor 27 will start with a configuration or initialization phase. In the case of the first module, that is to say for example in the case of the valve module 17, if it is connected as the first module in the daisy chain connection 41, the line DCI of the daisy chain connection 41 is connected with the system reset terminal of the microprocessor 27. In this respect this line is set at zero for a short time. At DCI=0 the DCO line of this module is also set at zero. This leads in turn to the DCI=0 condition in this case next module and so on. Accordingly all connected modules are set at the basic state. After the elapse of the reset time the line DCI of the first module, that is to say of the valve module 17, will assume the state 1. All other DCO and DCI lines keep to their 0 state. It is only in the case of this signal combination (DCI=0 and DCO=0) that access is possible to the respective module in the course of initialization phase.

The microprocessor 27 now performs a read access and at least one write access. The address decoder 32 possesses eight configuration outputs 43 with "open drain" properties. The microprocessor now reads the identification of the address decoder 32 or, respectively, of the valve module 17 via the lines 43 and the data bus 37. In this respect it will recognize the type of module in question, that is to say for instance whether it is a question of a module, which for control of a single control line merely requires one address or whether for control of several output lines several addresses are necessary. In two write accesses the microprocessor 27 now assigns one address and one address mask and transfers the same via the address bus 38 to the internal memory of the address decoder 32. When WRN=0 the module address to be programmed is accepted by the memory, serving as an address register, of the address decoder 32. At the valve module 17 one address mask is transmitted via the address bus 38 to the address decoder 32. This address mask determines the number of bytes, to which access, both writingly and also readingly, may be had in the operational mode. Accordingly an active address zone is specified. After this second write access the initialization of this module 17 is concluded and the DCO line changes to a 1 signal. Therefore the condition DCI=1 and DCO=0 is fulfilled in the case of the next module and the same may be initialized. This operation is repeated until all modules are identified and are provided with an address. The initialization is then terminated. The condition for the termination of initialization is fulfilled when all data lines carry a 1 signal. Then by a write access to a reserved address there is a switching over to the run mode. A write access to the reserved address means that all address decoders 29 through 33 may be simultaneously switched back into the initialization mode.

In the run mode all address decoders 29 through 33 operate in accordance with the previous program with which they have been loaded during the initialization phase, that is to say, they are able to be addressed through the address zone assigned to them. The software controlled switching over between the initialization and run mode takes place only via the address (38), RDN (39) and WRN (40) lines, that is to say no special data or control lines are necessary therefor. If an address corresponding to an assigned address is present in one of the address decoders on the address bus 38, then this address decoder will respond and with the read signal (RDN) and/or write signal (WRN) will produce logically linked output signals.

In the case of the address decoder 32 the decoder 44 is then enabled which in a manner dependent on the address supplied via the address lines 45 will enable one of its four outputs and with a corresponding output signal will access one of the four D-flipflops 46 through 49 via the clock input. Accordingly the signal coming in via the data bus 37 will be transferred to the output of the respective D-flipflops 46 through 49 and the corresponding valve 19 through 22 will be actuated.

Figure 3:
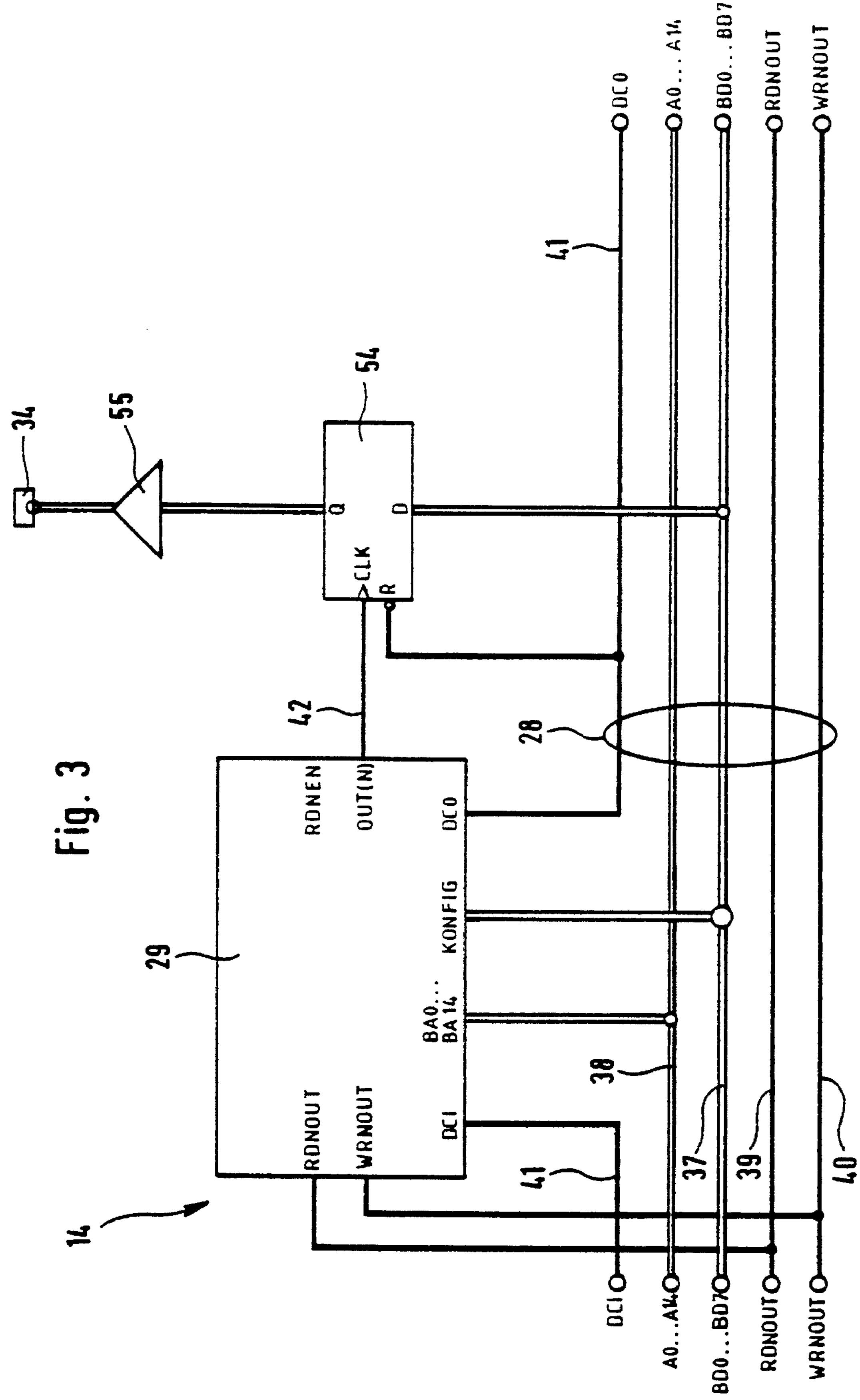
FIG. 3 is a circuit diagram of an output module.

FIG. 3 shows as an embodiment of the invention the circuit of an output module, for example the circuit of the output module 14, like parts being denoted by like reference numerals and not being described over again. The output line 42 is connected with the clock input of a single D-flipflop 54, whose output is connected via an output amplifier 55 with the output terminal 34, which for example may be designed in the form of a male or female plug system element. The manner of operation is also substantially similar to that of the embodiment of the invention depicted in FIG. 2. When the address decoder 29 is addressed by the address assigned to it, then via its output line 42 the control signal present on the data bus 37 is transmitted through the D-flipflop 54 to the output terminal 34 in order to control an external unit connected therewith, as for example an external hydraulic valve, a servo, a motor or the like.

The circuit of the module depicted in FIG. 3 may also be employed for the control of valves 19 through 26 of the valve range, if such valves are individually provided with address decoders.

Figure 4:
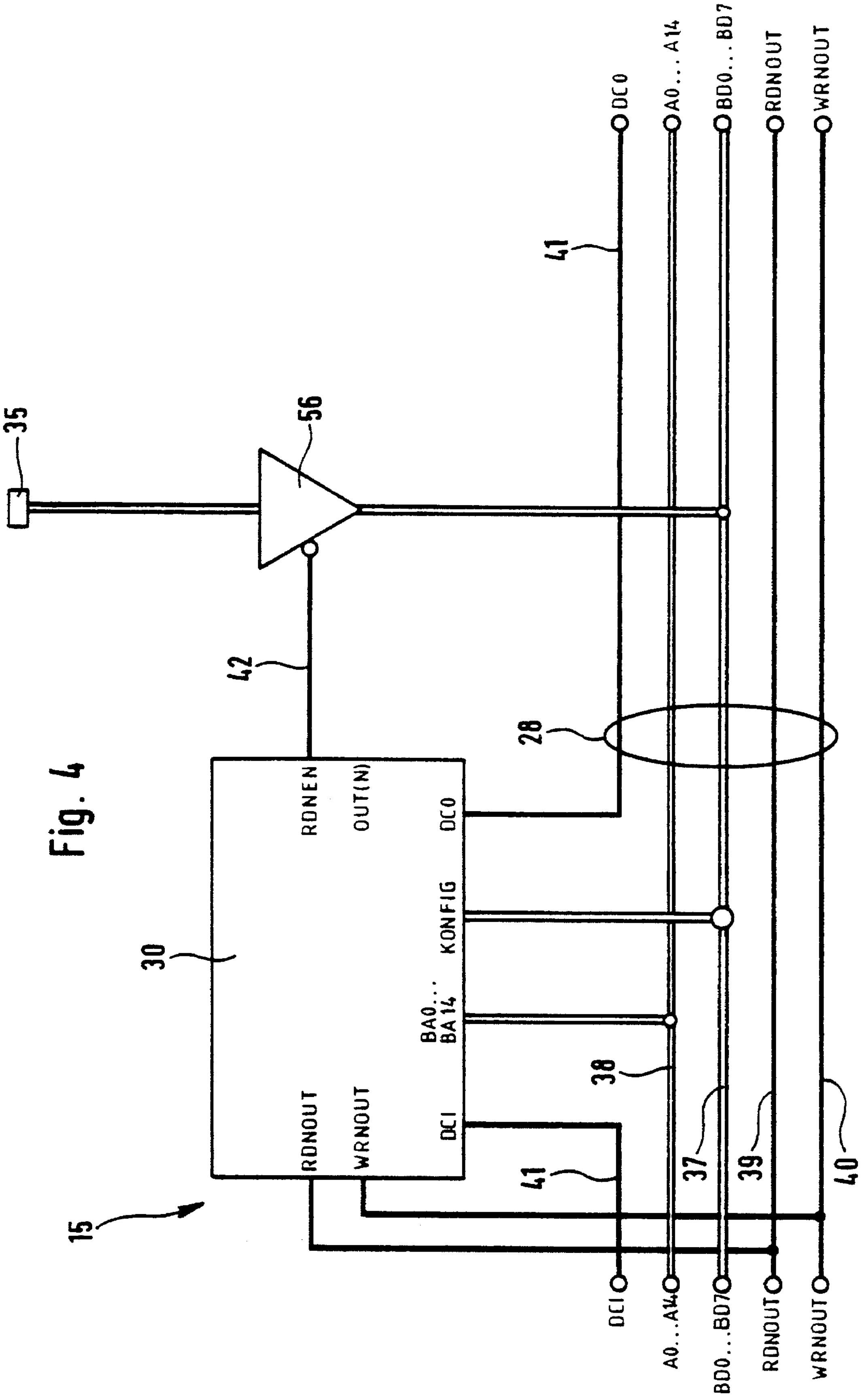
FIG. 4 is a circuit diagram of an input module.

As an embodiment of the invention FIG. 4 shows an input module, for example the input module 15. In this case as well like parts are denoted by like reference numerals and are not described again.

This input module 15 serves for the supply of external signals to the microprocessor 27, for instance sensor signals, limit switch signals or the like. The external signal passes via the input terminal 35 to a buffer 56, for which for instance the commercially available component HC 244 may be employed. When the address decoder 30 is addressed, then by means of a signal on the output line 42 the signal is transferred from the buffer 56 to the data bus 37 and thence to the microprocessor 27.

If the input signal is in the form of an analog signal, it is necessary for an analog/digital converter to be employed on the input side, the digital data word formed being transmitted via a buffer arrangement and several data lines to the data bus 37. By way of the output line 42 several buffers or buffer arrangement with several lines are controlled in parallel. In a corresponding manner it would also naturally be possible to form analog output signals by means of a digital/analog converter in the case of the arrangement of FIG. 3 as well, such signals then being supplied on the output side to several data lines of the data bus 37. It would naturally also be possible to design combined input-output modules, which in accordance with FIG. 3 would also be controlled as input lines in accordance with FIG. 4. This is something which could be designed for using a suitably large address zone of the address decoder.

We claim:

1. An electronic control device for a valve range of modular design, which comprises a fluid manifold arrangement fitted with at least one electrically controlled valve, the at least one electrically controlled valve being adapted to be controlled via at least one control module, said electronic control device further comprising at least one input and/or output module and a central electronic control unit, with which both the at least one control module and at least one input and/or output module can be connected for control and/or data communication therewith, wherein the control unit is connected with a variable number of control and input and/or output modules via a bus line system, each module including a programmable address decoder, and the electronic control device further including means for programming a sequential configuration of the modules and for the automatic assignment of addresses for each module.

2. The control device as claimed in claim 1, wherein the address decoders include write/read memories for the storage of assigned addresses.

3. The control device as claimed in claim 1, wherein the programming means for the sequential configuration of the modules and automatic assignment of addresses includes means for the sequential stepping of access to each address decoder by the control unit, during such access an address and/or an address mask being stored in the respective address decoders.

4. The control device as claimed in claim 3, wherein the addresses to be stored are arranged to be supplied via an address bus to the address decoders.

5. The control device as claimed in claim 3, wherein the sequential configuration is performed as an initialization phase.

6. The control device as claimed in claim 3, comprising means for the interrogation and identification of the respective module during the access phase, corresponding individual module identification data being able to be transmitted via a data bus to the control unit.

7. The control device as claimed in claim 6, comprising means for linking transmitted module identification data in the control unit with the address assigned to the corresponding module.

8. The control device as claimed in claim 3, comprising means for the automatic switching over to a run phase after performance of the sequential configuration.

9. The control device as claimed in claim 3, comprising means for starting the sequential configuration by a write access to an address reserved thereof.

10. The control device as claimed in claim 1, wherein each valve is associated with an address decoder.

11. The control device as claimed in claim 1, wherein a plurality of valves are associated with an address decoder of a single control module, the address decoder being loaded with an address mask and/or a corresponding number of addresses.

12. The control device as claimed in claim 1, wherein outputs of the address decoders associated with each of the modules are connected with electronic switches controlling the passage of input and/or output signals.

13. The control device as claimed in claim 1, wherein the central control unit comprises a field bus station, the field bus station being one of a master station, a slave station and an independent valve range.

14. The control device as claimed in claim 1, wherein the control and input and/or output modules are arranged in at least one row.

15. The control device as claimed in claim 14, wherein the control and input and/or output modules are adapted to be screwed together in the at least one row.

16. An electronic control device for a valve range of modular design, which comprises a fluid manifold arrangement fitted with at least one electrically controlled valve, the at least one electrically controlled valve being adapted to be controlled via at least one control module, said control device further comprising at least one input and/or output module and a central electronic control unit, with which the at least one control module and at least one input and/or output module can be connected for control and/or data communication therewith, wherein the control unit is connected with the modules via a bus line system, and wherein each control and input and/or output module includes a programmable address decoder and wherein at least one valve is associated with each control module address decoder, and further including means for programming a sequential configuration of the modules and for the automatic assignment of addresses for each module.

17. The control device as claimed in claim 16, wherein a plurality of valves are associated with an address decoder which is loaded with an address mask and/or a corresponding number of addresses.

18. An electronic control device for a valve range of modular design, which comprises a fluid manifold arrangement fitted with at least one electrically controlled valve, the at least one electrically controlled valve being adapted to be controlled via at least one control module, said control device further comprising at least one input and/or output module and a central electronic control unit, with which the at least one control module and the at least one input and/or output module can be connected for control and/or data communication therewith, wherein the control unit is connected with the control and input and/or output modules via a bus line system, and wherein each module includes a programmable address decoder, the outputs of the address decoders associated with the control and input and/or output modules being connected to electronic switches controlling the passage of input and/or output signals, and wherein the control device further includes means for programming a sequential configuration of the modules and for the automatic assignment of addresses for each module.

19. An electronic control device for a valve range of modular design, which comprises a fluid manifold arrangement fitted with at least one electrically controlled valve, the at least one electrically controlled valve being adapted to be controlled via at least one control module, said control device further comprising at least one input and/or output module and a central electronic control unit, with which the at least one control module and the at least one input and/or output module can be connected for control and/or data communication therewith, wherein the control unit is connected with the control and input and/or output modules via a bus line system, and wherein each control and input and/or output module includes a programmable address decoder, and means for programming a sequential configuration of the modules and for the automatic assignment of the individual addresses for each module, wherein the central control unit comprises a field bus station, the field bus station being one of a master station, a slave station and an independent valve range.

* * * * *